(12) United States Patent
Hisai et al.

(10) Patent No.: US 11,674,587 B2
(45) Date of Patent: Jun. 13, 2023

(54) PLANETARY GEAR DEVICE

(71) Applicant: Enplas Corporation, Saitama (JP)

(72) Inventors: Koki Hisai, Saitama (JP); Kazuki Yamada, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/705,432

(22) Filed: Mar. 28, 2022

(65) Prior Publication Data

US 2022/0307583 A1 Sep. 29, 2022

(30) Foreign Application Priority Data

Mar. 29, 2021 (JP) ............................... JP2021-055874

(51) Int. Cl.
*F16H 57/031* (2012.01)
*F16H 57/021* (2012.01)
*F16H 1/28* (2006.01)
*F16H 57/08* (2006.01)

(52) U.S. Cl.
CPC .......... *F16H 57/031* (2013.01); *F16H 57/021* (2013.01); *F16H 1/28* (2013.01); *F16H 57/082* (2013.01)

(58) Field of Classification Search
CPC ........ F16H 57/031; F16H 57/021; F16H 1/28; F16H 57/082; F16H 57/08
See application file for complete search history.

(56) References Cited

U.S. PATENT DOCUMENTS

| | | | |
|---|---|---|---|
| 4,838,123 A | 6/1989 | Matoba | |
| 8,499,664 B2 * | 8/2013 | White | F16C 19/30 180/371 |
| 9,303,727 B2 * | 4/2016 | Reimann | F16H 57/082 |
| 9,791,026 B2 * | 10/2017 | Saxstetter | E05F 15/622 |
| 10,006,532 B2 * | 6/2018 | Mori | F16H 48/40 |
| 10,221,928 B2 * | 3/2019 | Mori | F16H 48/08 |
| 2015/0105208 A1 * | 4/2015 | Hagedorn | E05F 15/614 475/149 |

FOREIGN PATENT DOCUMENTS

| | | | | |
|---|---|---|---|---|
| CN | 104930176 A | * | 9/2015 | ............... F16H 1/28 |
| CN | 105370809 A | * | 3/2016 | |
| CN | 110486424 A | * | 11/2019 | ............... F16H 1/28 |
| JP | 06-074835 | | 9/1994 | |
| KR | 20170033014 A | * | 3/2017 | |
| KR | 101755257 B1 | * | 7/2017 | |
| WO | WO-2016006271 A1 | * | 1/2016 | ........... B60K 17/046 |

* cited by examiner

*Primary Examiner* — Sherry L Estremsky

(57) ABSTRACT

A planetary gear device includes: a housing cover disposed at one end portion of a housing in an axis direction, the housing being configured to house a sun gear and a planetary gear inside the housing; and a carrier cover disposed next to the housing cover in the axial direction in the inside, and configured to support a shaft of the planetary gear from one end portion side in the axial direction. One opposing part of a pair of opposing parts opposite to each other in the housing cover and the carrier cover includes a cone-shaped part whose diameter varies in the axial direction, and the other opposing part of the pair of opposing parts includes a sliding part configured to slide on a peripheral surface of the cone-shaped part with a same axis as an axis of the cone-shaped part.

3 Claims, 11 Drawing Sheets

PLANETARY GEAR DEVICE

CROSS REFERENCE TO RELATED APPLICATIONS

This application claims the benefit of priority of Japanese Patent Application No. 2021-055874 filed on Mar. 29, 2021, the contents of which are incorporated by reference as if fully set forth herein in their entirety.

TECHNICAL FIELD

The present invention relates to a planetary gear device.

BACKGROUND ART

As disclosed in Japanese Examined Patent Publication No. H6-74835 (hereinafter referred to as PTL 1), planetary gear devices are used for various machines such as automobiles and robots as decelerators for decelerating and outputting an input rotation.

PTL 1 discloses a planetary gear device that decelerates the rotation of the motor and transmits it to the output shaft. Such a planetary gear device houses components such as a sun gear, an inner gear and a carrier, in a housing.

More specifically, in a planetary gear device, a sun gear is fixed to a drive shaft of a motor inserted from one end surface side of the housing, in a housing. Between the sun gear and the inner gear, which is disposed with the same axis as the sun gear to surround the sun gear, a planetary gear that meshes with both of them is disposed. The planetary gear is supported to a carrier that is rotatably provided with the same axis as the sun gear such that the planetary gear rotates on its own axis and in orbit around the sun gear. The planetary gear converts the rotation of the sun gear into the rotation of the carrier, and outputs its rotational force.

Incidentally, in the case where a planetary gear device is attached to a motor, especially, in the case of the use for opening closing the back door of an automobile, a planetary gear device with high quietness is desired since it is disposed in the automobile.

In such a planetary gear device with high quietness and high-speed gear rotation, the carrier is supported by using a so-called "floating" support structure without using a bearing for supporting the carrier in order to accommodate working errors and assembling errors, which lead to noise sources. In this manner, the load to be exerted on each planetary gear during the driving is equally distributed to reduce the variable load as much as possible.

CITATION LIST

Patent Literature

PTL 1
Japanese Examined Patent Publication No. H6-74835

SUMMARY OF INVENTION

Technical Problem

In the structure in which the carrier is supported in a "floating" manner, however, the carrier is supported through the planetary gear that meshes with the sun gear and the inner gear in practice. As such, the axial deviation of the carrier occurs when the carrier is rotated with high speed, and the rotation of the carrier is destabilized.

In view of such points, an object of the present invention is to provide a planetary gear device that suppresses the rotational axial deviation of the carrier for stable driving.

Solution to Problem

To achieve the above-mentioned object, a planetary gear device according to an embodiment of the present invention includes: a housing cover disposed at one end portion of a housing in an axis direction, the housing being configured to house a sun gear and a planetary gear inside the housing; and a carrier cover disposed next to the housing cover in the axial direction in the inside, and configured to support a shaft of the planetary gear from one end portion side in the axial direction. One opposing part of a pair of opposing parts opposite to each other in the housing cover and the carrier cover includes a cone-shaped part whose diameter varies in the axial direction, and the other opposing part of the pair of opposing parts includes a sliding part configured to slide on a peripheral surface of the cone-shaped part with a same axis as an axis of the cone-shaped part.

Advantageous Effects of Invention

According to the embodiment of the present invention, it is possible to provide a planetary gear device that suppresses the rotational axial deviation of the carrier for stable driving.

DESCRIPTION OF EMBODIMENTS

An embodiment of the present invention is elaborated below with reference to the accompanying drawings.

Figure 1:
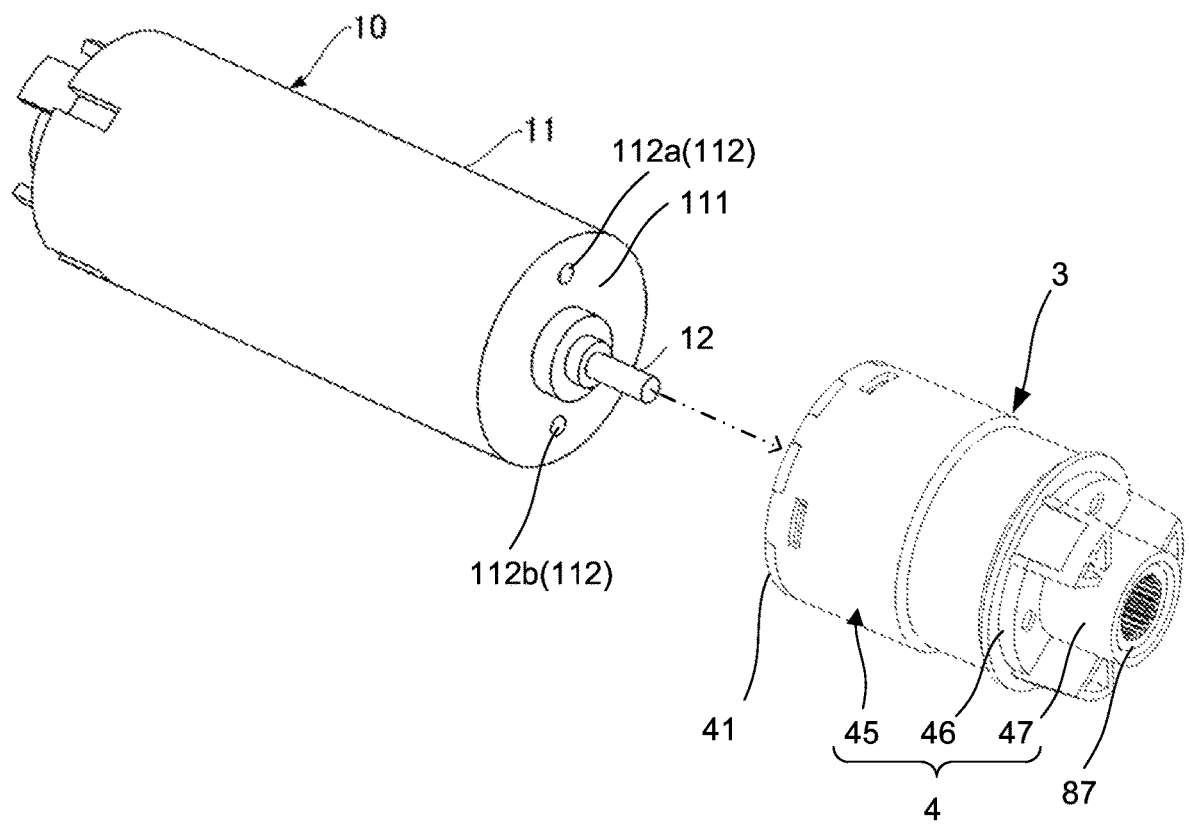
FIG. 1 is a perspective view illustrating an actuator including a planetary gear device of an embodiment of the present invention.
Figure 2:
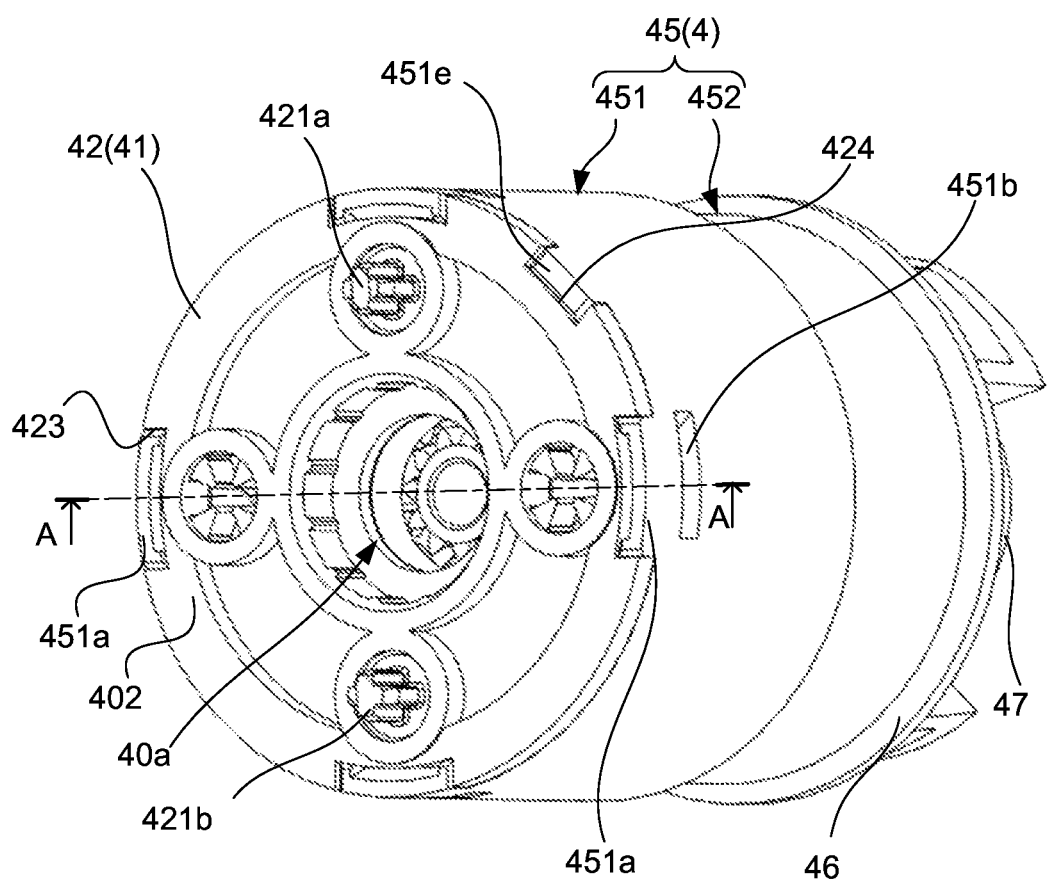
FIG. 2 is a rear perspective view of the planetary gear device of the embodiment of the present invention.
Figure 3:
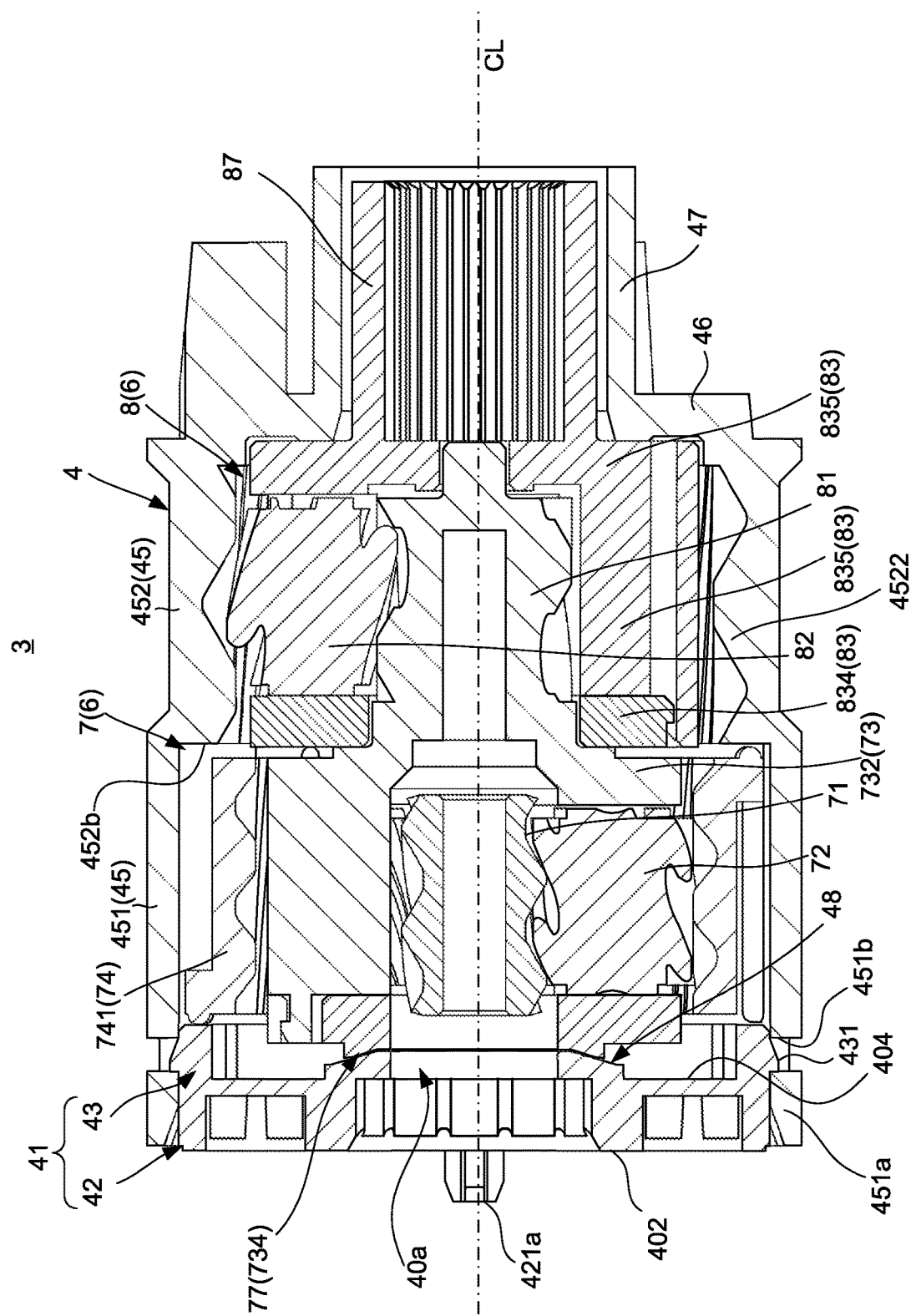
FIG. 3 is a longitudinal sectional view of the planetary gear device taken along the axis direction.
Figure 4:
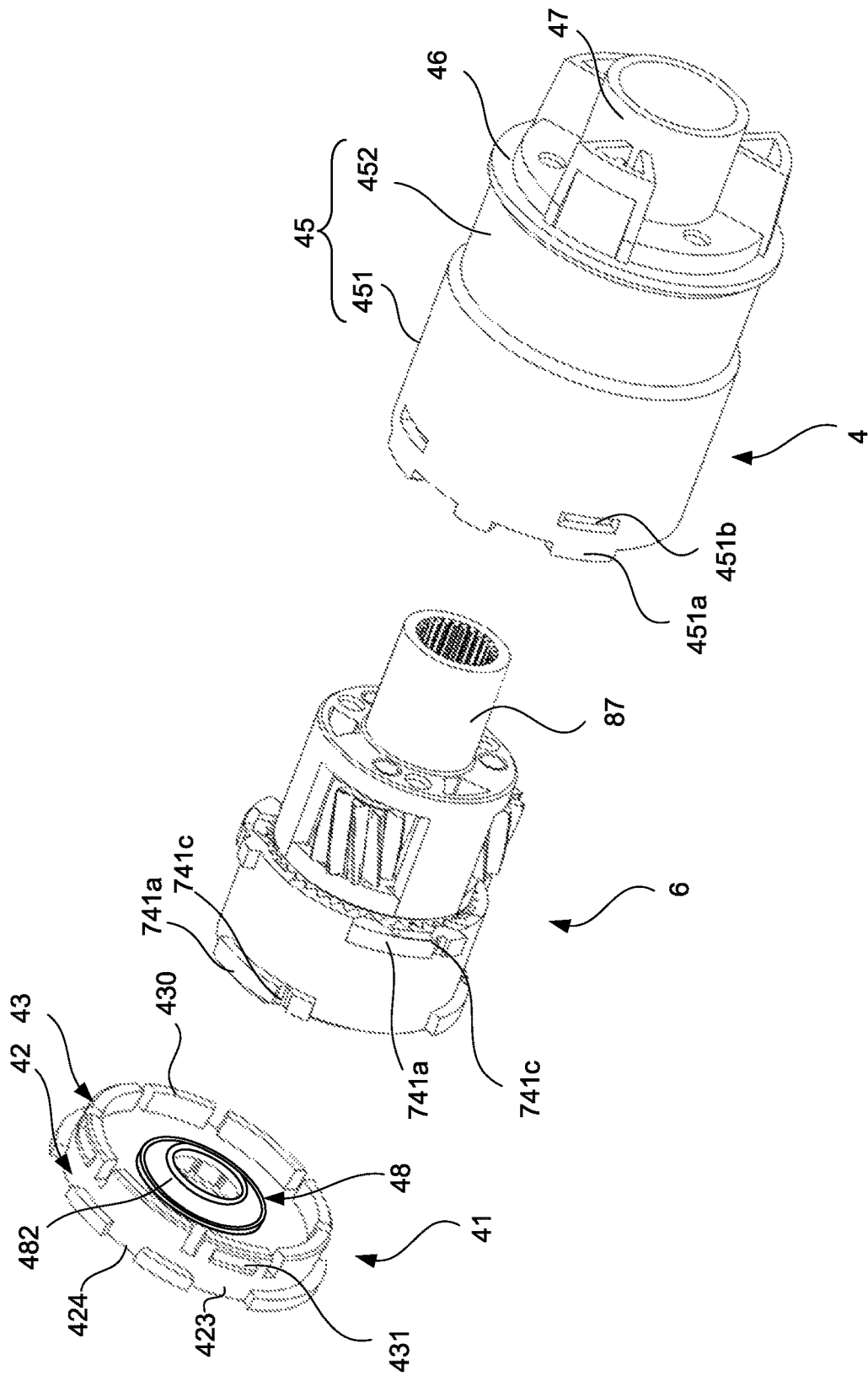
FIG. 4 is an exploded perspective view of the planetary gear device of the embodiment of the present invention.

FIG. 1 is a perspective view illustrating an actuator including a planetary gear device of an embodiment of the present invention, FIG. 2 is a rear perspective view of the planetary gear device, FIG. 3 is a longitudinal sectional view of the planetary gear device taken along the axis direction. FIG. 4 is an exploded perspective view of the planetary gear device of an embodiment of the present invention.

In the following description, the horizontal direction in FIGS. 1 and 3 is referred to as axial direction. In addition, the left direction in FIGS. 1 and 3 is referred to as one side in the axial direction, and the right direction is referred to as the other side in the axial direction. Unless otherwise noted, the axial direction means the axis direction of each member that makes up the planetary gear device.

In addition, the direction orthogonal to the axial direction in FIGS. 1 and 3 is referred to as radial direction. Unless otherwise noted, the radial direction means the radial direction of each member that makes up the planetary gear device. The outside in the radial direction means a direction away from the center of each member that makes up the planetary gear device in the radial direction. The inside in the radial direction means a direction approaching toward the center of each member that makes up the planetary gear device in the radial direction.

In addition, in FIGS. 1 and 3, the direction around the central axis of the planetary gear device that is parallel to the axial direction is referred to as circumferential direction. Unless otherwise noted, the circumferential direction means the circumferential direction of each member that makes up the planetary gear device.

Actuator 1

Planetary gear device 3 illustrated in FIGS. 1 to 4 is attached to motor 10 and makes up actuator 1. For example, actuator 1 is used as an actuator of an electric back door of an automobile used for opening and closing a back door of actuator 1. Note that the usage of actuator 1 is not limited to this.

Motor

Motor 10 illustrated in FIG. 1 includes motor body 11 and rotation shaft 12. Motor 10 operates under the control of a control part (not illustrated in the drawing), and drives planetary gear device 3 by rotating rotation shaft 12.

Motor body 11 includes support surface 111 for supporting planetary gear device 3 at the end surface on the other side in the axial direction (the right end surface in FIG. 1). Motor body 11 includes a plurality of (two, in the present embodiment) motor side fixation holes 112 at support surface 111.

Motor side fixation hole 112 is, for example, an engaging hole that engages with the insertion object, and is provided at even intervals (at 180° intervals) in the circumferential direction at support surface 111. Motor side fixation hole 112 engages with a planetary side fixing part on the planetary gear side for fixing planetary gear device 3 to motor 10. Motor side fixation hole 112 and the planetary side fixing part may fix planetary gear device 3 such that a fastening member (not illustrated in the drawing) such as a bolt is threadedly engaged with motor side fixation hole 112 and the planetary side fixing part in a hole form, for example. In the present embodiment, the planetary side fixing part is protruding planetary side fixing parts 421a and 421b provided in planetary gear device 3 as illustrated in FIGS. 2 and 3. Planetary gear device 3 is fixed to motor 10 by pressing planetary side fixing parts 421a and 421b into motor side fixation hole 112 (112a, 112b). Motor 10 may be a member for supporting planetary gear device 3 described later. Note that the type of the motor is not limited, and various electric motors known in the related art may be employed.

Planetary Gear Device

Planetary gear device 3 outputs the rotation input from motor 10 after decelerating it at a predetermined deceleration ratio. As illustrated in FIGS. 1 to 4, planetary gear device 3 includes housing 4, planetary gear mechanism 6 housed in housing 4, and housing cover 41.

Housing 4

In the present embodiment, housing 4 houses the plurality of planetary gears mechanisms 7 and 8 connected as planetary gear mechanism 6 together with housing cover 41 and achieves the deceleration of multiple stages. In housing 4, planetary gear mechanism 6 decelerates, in two stages, the rotation of rotation shaft 12 through driving of motor 10, and outputs it from output shaft connecting part 87.

Housing Cover 41

For example, housing cover 41 is a member for attaching motor 10 to planetary gear device 3.

Housing cover 41 is disposed at one end portion of housing 4 in the axis direction. Housing cover 41 includes through hole 40a at a center portion, and includes annular fixing part 42 and cylindrical connection cylindrical part 43. Fixing part 42 and connection cylindrical part 43 of housing cover 41 are made of synthetic resin and are integrally shaped by injection molding, for example. Rotation shaft 12 of motor 10 is inserted to through hole 40a.

In fixing part 42, the outer surface side in the axial direction is a portion fixed to support surface 111 of motor body 11. Fixing part 42 includes a plurality of (two, in the present embodiment) planetary side fixing parts 421a and 421b. Planetary side fixing parts 421a and 421b are formed in shapes protruding in the axial direction at axial direction outer surface 402.

Planetary side fixing parts 421a and 421b are provided at fixing part 42 at positions corresponding to motor side fixation hole 112 of motor body 11. By inserting (for example, press-fitting) and engaging planetary side fixing parts 421a and 421b to fixation holes 112a and 112b, housing cover 41 is fixed to motor 10 while limiting the rotation of housing cover 41, i.e., the rotation of planetary gear device 3.

In addition, fixing part 42 includes a plurality of (the present embodiment, five) recessed engaging recesses 423 and 424 cut in the axial direction at the outer periphery portion. Engaging recesses 423 and 424 are engaged with key protrusion 451e and engaging protrusion 451a of housing 4 in the axial direction.

In addition, fixing part 42 includes housing side opposing part 48 facing planetary gear mechanism 6 at the other end portion side in the axis direction of fixing part 42, i.e., side surface 404 of housing 4 (see FIGS. 3 and 4). The portion of planetary gear mechanism 6 facing opposing part 48 is opposing part (also referred to as the carrier side opposing part) 77 on carrier cover 734 side. Note that side surface 404 of housing 4 is also referred to as "housing cover inner surface" below. One of the pair of opposing parts 48 and 77 includes a cone-shaped part whose diameter varies in the axial direction, and the other opposing part includes a sliding part that slides on the peripheral surface of the cone-shaped part with the same axis as the axis of the cone-shaped part.

Housing side opposing part 48 corresponds to the sliding part, and is provided upright at housing cover inner surface 404 to surround through hole 40a. Housing side opposing part 48 includes a cone-shaped protrusion whose center portion protrudes relative to outer periphery part 482. The cone-shaped protrusion may be, for example, a conical protrusion with a truncated circular cone shape whose outer diameter decreases in the protruding direction.

Housing side opposing part 48 is provided integrally with fixing part 42 such that its axis is the same axis as fixing part 42.

At the tilted surface of outer periphery part 482, housing side opposing part 48 slides on the tapered surface of carrier side opposing part 77. Through this slide movement, both opposing parts 48 and 77 slide with the same axis. In this manner, the axial deviation between housing 4 where housing cover 41 is attached and planetary gear mechanism 6 (first carrier 73) inside housing 4 is eliminated.

Note that while the above-described housing side opposing part 48 has a cone-shaped protrusion, this is not limitative, and any configuration may be employed as long as the housing and the carrier are rotatable with the same axis.

For example, in housing side opposing part 48, a plurality of protrusions protruding in the axial direction may be provided at positions surrounding the through hole, and the housing and the carrier may rotate with the same axis, with the plurality of protrusions sliding on the tapered surface of the carrier side opposing part around the same axis.

Connection cylindrical part 43 is configured in a cylindrical shape with a plurality of arched wall parts 430 protruding from the outer periphery of housing cover inner surface 404 of fixing part 42 and extending in the circumferential direction. Connection cylindrical part 43 is provided integrally with fixing part 42 at the end portion on one side (the left end portion, in FIGS. 1 and 3) in the axis direction of connection cylindrical part 43. Note that in the following description, the end portion on one side in the axial direction is referred to also as one end portion in the axial direction, the end portion of the other side in the axial direction is also referred to as the other end portion in the axial direction.

Connection cylindrical part 43 attaches housing cover 41 to housing 4 without allowing removal, and houses planetary gear mechanism 6 together with housing 4.

At the outer peripheral surface of predetermined arched wall part 430, connection cylindrical part 43 includes a plurality of (four, in the present embodiment) engaging claw parts 431 that engages with one end portion of housing 4 in the axis direction. Connection cylindrical part 43 is connected with housing 4 through engaging claw part 431. Note that details of the engagement of engaging claw part 431 and engaging hole 451b of housing 4 are described later.

Housing 4

Figure 5:
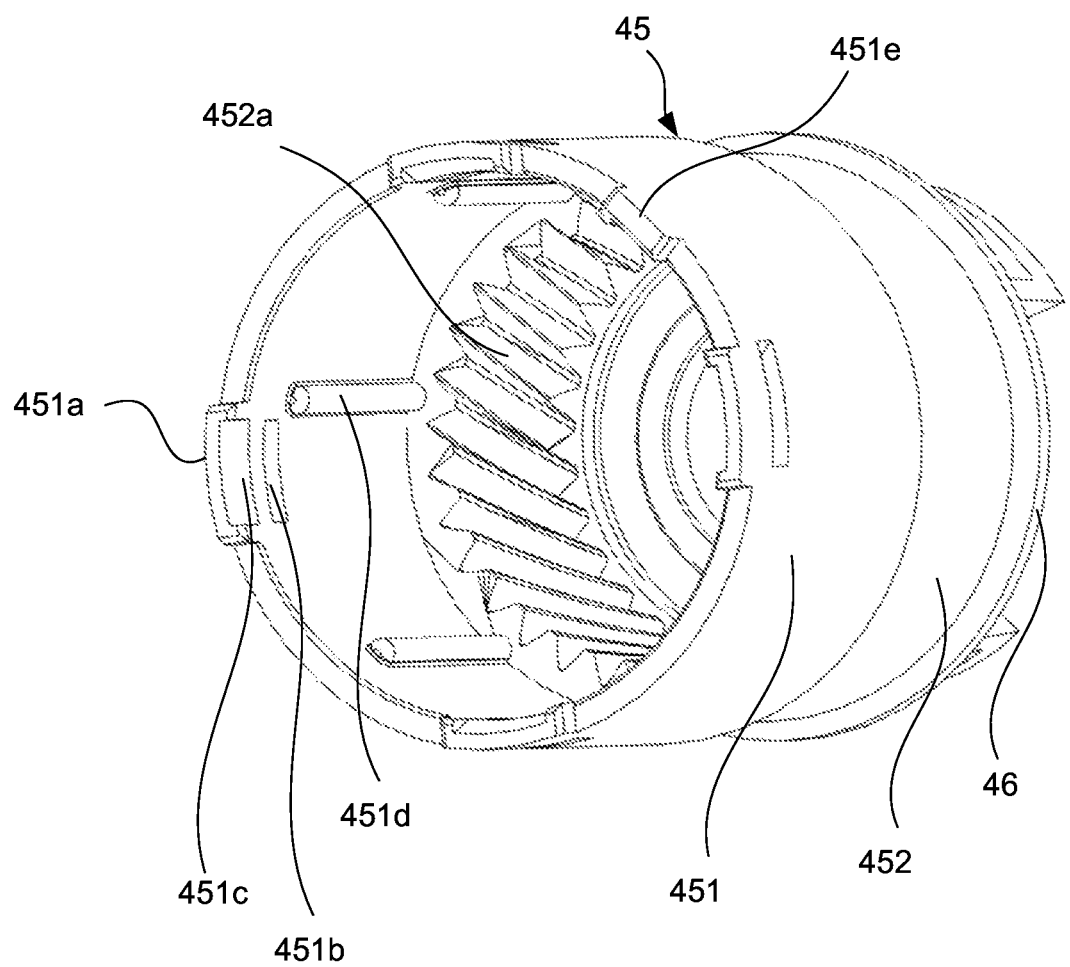
FIG. 5 is a diagram for describing a housing.

FIG. 5 is a perspective view illustrating a housing as viewed from one side in the axial direction. As illustrated in FIGS. 3 and 5, housing 4 is open at an end portion on one side in the axial direction where cover 41 is attached.

Housing 4 includes body cylindrical part 45 and annular part 46 including support cylindrical part 47.

Body cylindrical part 45 has a cylindrical shape and houses planetary gear mechanism 6 inside. More specifically, body cylindrical part 45 includes first housing element 451 that houses first planetary gear mechanism 7, and second housing element 452 that houses second planetary gear mechanism 8 in this order from one side in the axial direction (the left side in FIG. 3). Second housing element 452 houses second planetary gear mechanism 8, with output shaft connecting part 87 protruded from body cylindrical part 45 to the other side in the axial direction (the right side in FIG. 3). Note that housing 4, more specifically, first housing element 451 and second housing element 452, is made of synthetic resin, and is shaped integrally with annular part 46 including support cylindrical part 47 by injection molding, for example.

In first housing element 451, a plurality of (four, in the present embodiment) engaging holes 451b extending in the circumferential direction is provided at one end portion in the axial direction (hereinafter referred to as first end portion of first housing element 451).

Engaging hole 451b is formed in a slit shape extending in the circumferential direction, and engages with engaging claw part 431. At the inner peripheral surface of the first end portion of first housing element 451, guide groove 451c that is cut out in a recessed shape to open to the axis side of housing 4 is provided in a location near engaging hole 451b on one side in the axial direction. When housing cover 41 is attached to housing 4, guide groove 451c guides sliding engaging claw part 431 to engaging hole 451b on the other side in the axial direction, thus facilitating their engagement. Guide groove 451c is provided on a portion of the inner peripheral surface side of engaging protrusions 451a.

Engaging protrusion 451a extends in the axial direction at plural positions in the circumferential direction at the first end portion of first housing element 451. When the first end portion of first housing element 451 is fitted to connection cylindrical part 43 of housing cover 41 from the outside, engaging protrusion 451a engages with engaging recess 423.

Specifically, when fitted to connection cylindrical part 43 of housing cover 41 from the outside, engaging hole 451b engages with engaging claw part 431 of housing cover 41, and engaging protrusion 451a engages with engaging recess 423 of fixing part 42 in housing cover 41. Additionally, key protrusion 451e engages with cutout part 424.

In housing 4, the movement in the axial direction and the circumferential direction with respect to connection cylindrical part 43 is limited, through the engagement of engaging hole 451b and engaging claw part 431. In addition, in housing 4, the movement in the circumferential direction with respect to connection cylindrical part 43 is limited, through the engagement of engaging protrusion 451a and engaging recess 423. In addition, in housing 4, housing cover 41 can be assembled to a predetermined position, through the engagement of key protrusion 451e and cutout part 424.

First housing element 451 includes a plurality of (four, in the present embodiment) ridges 451d extending in the axial direction at a portion that faces the outer peripheral surface of first inner gear 74 described later in the radial direction, in the inner peripheral surface.

In the circumferential direction, ridge 451d engages with outer periphery groove part 741c provided at the outer periphery of first inner gear 74 described later. In addition, a small gap is present in the radial direction between the inner peripheral surface of first housing element 451 and the outer peripheral surface of first inner gear 74. With ridge 451d and outer periphery groove part 741c making point contact or line contact with each other, first housing element 451 movably supports first inner gear 74 such that the axis line of first inner gear 74 is slightly tilted with respect to the central axis of first housing element 451 (housing 4).

One end portion of second housing element 452 in the axis direction (hereinafter referred to as first end portion of second housing element 452) is connected to the other end portion of first housing element 451 in the axis direction (hereinafter referred to as second end portion of first housing element 451).

Second housing element 452 includes second inner gear part 452a including teeth extending in the axial direction on the inner peripheral surface. Second inner gear part 452a is helical gear, and engages with second planetary gear 82 of second planetary gear mechanism 8 described later.

Note that second inner gear part 452*a* may be a spur gear. In addition, second housing element 452 may be interpreted as the inner gear of second planetary gear mechanism 8. In addition, the inner gear of second planetary gear mechanism 8 may be a member provided separately from housing 4. In this case, a second inner gear part is provided at the inner peripheral surface of an inner gear provided separately from housing 4. Then, this inner gear is fixed (internally fitted) to housing 4. This inner gear may be supported in a floating manner by housing 4 as with first inner gear 74 of first planetary gear mechanism 7 described later.

The internal diameter of second housing element 452 is smaller than the internal diameter of first housing element 451. As a result, step 452*b* is present at the connecting part between second housing element 452 and first housing element 451 (i.e., one side end surface of second housing element 452 in the axis direction).

Note that in the axial direction, step 452*b* faces the other end portion of first inner gear 74 in the axis direction (hereinafter referred to as second end portion of first inner gear 74). Step 452*b* limits the movement of first inner gear 74 to the other side in the axis direction, to a predetermined amount.

Annular part 46 has an annular shape, and is connected to the other end portion of housing 4 in the axis direction. More specifically, an outer end portion of annular part 46 in the radial direction is provided integrally with an end portion of housing 4 on the other side.

Support cylindrical part 47 has a cylindrical shape contiguous with the center opening of annular part 46, and is provided upright along the axial direction on the other side in the axial direction, i.e., the output side. Support cylindrical part 47 rotatably supports output shaft connecting part 87, with its connection port externally exposed. In this manner, the torque output by output shaft connecting part 87 can be transmitted to the external mechanism by connecting the output shaft, or the output destination member of the rotational force to output shaft connecting part 87. In addition, support cylindrical part 47 limits the movement of second carrier 83 to the other side in the axis direction, to a predetermined amount.

Housing 4 having the above-mentioned configuration is fixed to motor 10 through housing cover 41, with planetary gear mechanism 6 housed therein.

Planetary Gear Mechanism 6

As illustrated in FIGS. 3 and 4, planetary gear mechanism 6, which is housed in housing 4, decelerates the rotation transmitted from motor 10 and outputs it through shaft connecting part 87. Planetary gear mechanism 6 includes first planetary gear mechanism 7 and second planetary gear mechanism 8 disposed along the axis direction.

First Planetary Gear Mechanism 7

Figure 6:
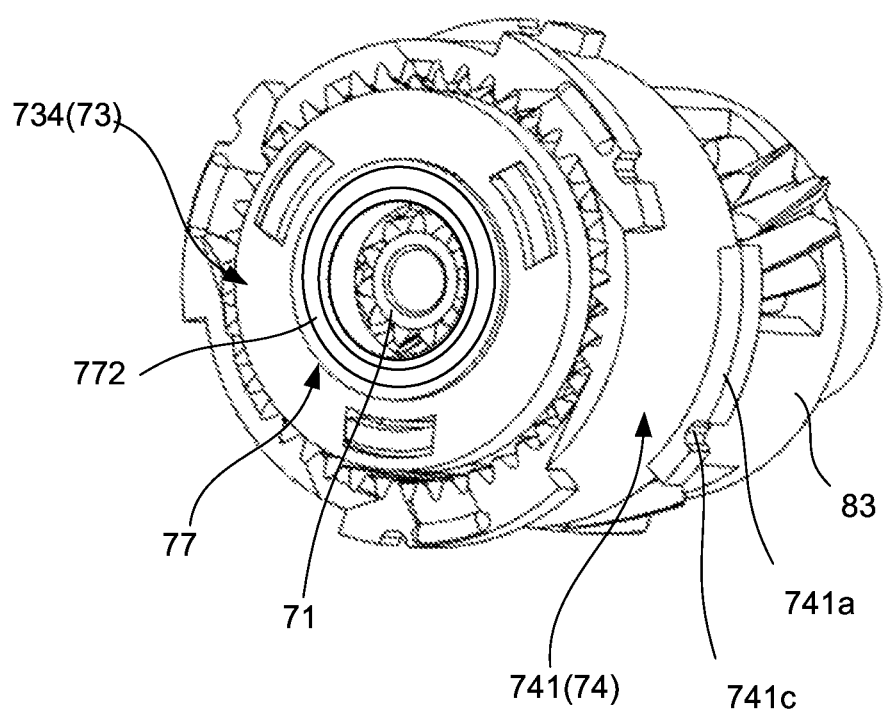
FIG. 6 is a rear perspective view of a planetary gear mechanism housed in a housing in the planetary gear device of the embodiment.
Figure 7:
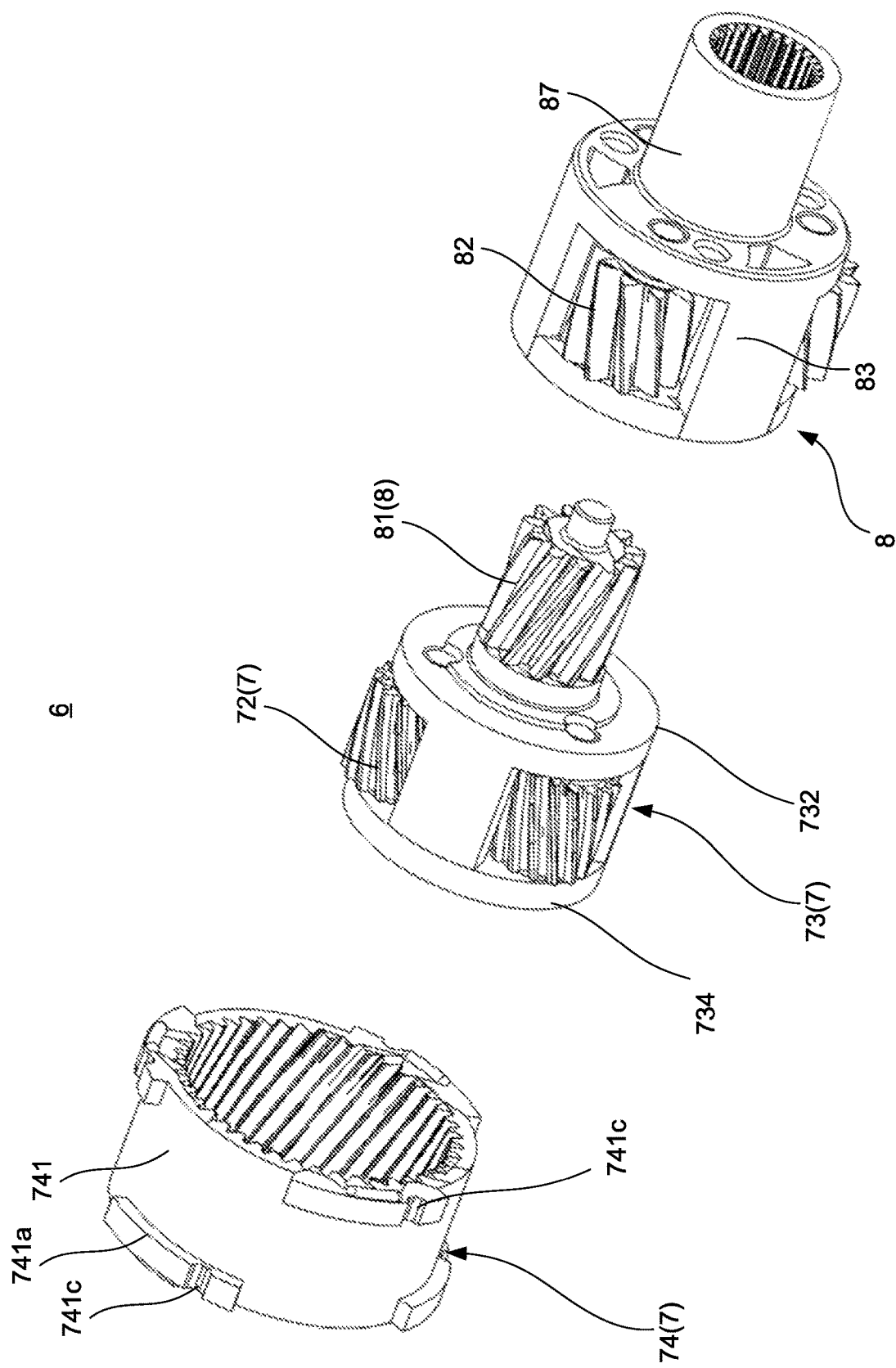
FIG. 7 is an exploded perspective view of the planetary gear mechanism.
Figure 8:
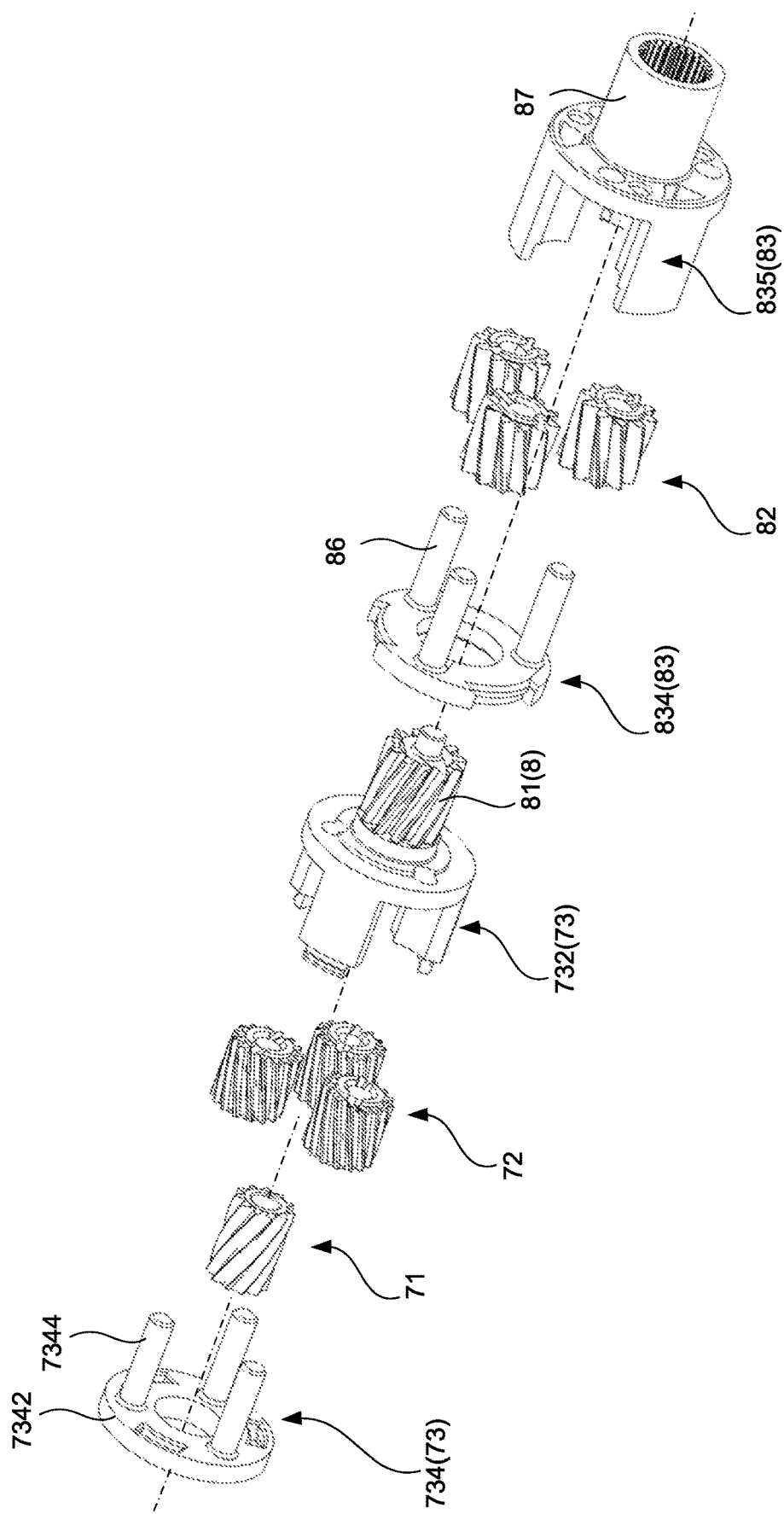
FIG. 8 is an exploded front perspective view illustrating a main configuration of the planetary gear mechanism from which the inner gear is removed.
Figure 9:
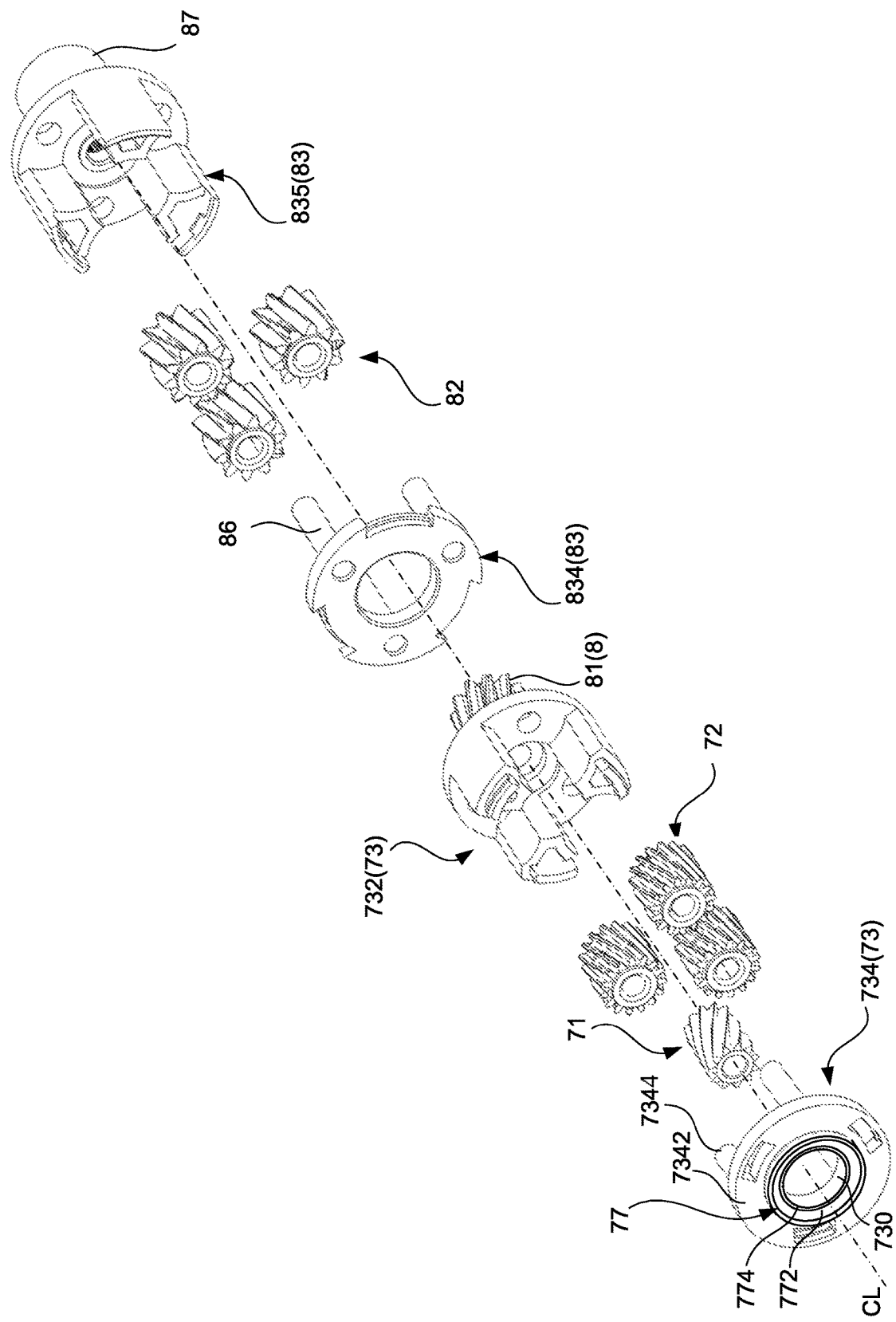
FIG. 9 is an exploded rear-front perspective view including a main configuration of the planetary gear mechanism from which the inner gear is removed.

FIG. 6 is a rear perspective view of a planetary gear mechanism in the planetary gear device of the embodiment housed in the housing, and FIG. 7 is an exploded perspective view of the planetary gear mechanism. In addition, FIG. 8 is an exploded front perspective view illustrating a main configuration of the planetary gear mechanism from which the inner gear is removed, and FIG. 9 is an exploded rear-front perspective view including a main configuration of the planetary gear mechanism from which the inner gear is removed.

First planetary gear mechanism 7 includes sun gear 71, a plurality of planetary gears 72 disposed around sun gear 71, first carrier 73 that rotatably supports the plurality of planetary gears 72, and first inner gear 74. While it suffices that first planetary gear mechanism 7 includes one or more planetary gears 72, it includes three planetary gears 72 in the present embodiment.

Sun gear 71 is an outer gear with a sun teeth portion formed in the outer peripheral surface. Sun gear 71 is connected to rotation shaft 12 of motor 10 and is rotatable with the same central axis as rotation shaft 12. Sun gear 71 rotates through driving of motor 10. For example, the sun teeth portion includes spiral teeth cut obliquely to the axis of sun gear 71, and sun gear 71 of the present embodiment is a so-called helical gear.

Planetary gear 72 is an outer gear with planetary teeth formed in the outer peripheral surface. The plurality of planetary gears 72 is disposed at even intervals between sun gear 71 and first inner gear 74, and engages with both sun gear 71 and first inner gear 74. For example, the plurality of planetary gears 72 is disposed on the same circle around the axis of first planetary gear mechanism 7, and rotatably supported by first carrier 73. In the present embodiment, the planetary teeth are spiral teeth cut obliquely to the shaft of planetary gear 72, and planetary gear 72 of the present embodiment is a so-called helical gear.

Each planetary gear 72 rotates around its own central axis (planetary shaft part 7344) on the basis of the rotation of sun gear 71. In addition, each planetary gear 72 rotates around sun gear 71 on the basis of its rotation and the engagement with first inner gear 74. The central axis of the rotation of planetary gear 72 may coincide with the central axis of sun gear 71.

First carrier 73 supports planetary gear 72 such that planetary gear 72 is rotatable (on its own axis). Additionally, first carrier 73 rotates on the basis of the rotation of planetary gear 72, and transmits the rotation to second planetary gear mechanism 8. In addition, first carrier 73 is formed in a cylindrical shape, and houses planetary gear 72 in the housing opening (omitted in the drawing) formed in its outer peripheral surface. Each planetary gear 72 is supported such that it is rotatable by planetary shaft part 7344 directed to the axis direction in the housing opening. In the present embodiment, planetary gear 72 is attached such that it partially protrudes outward from the housing opening in the radial direction in the state where it is protruded from the outer peripheral surface of first carrier 73. In this manner, the planetary teeth mesh with the inner teeth of first inner gear 74.

In addition, in planetary gear mechanism 6, first carrier 73 includes opposing part 77 that makes up a high speed stage side end portion, i.e., the end portion on one side in the axial direction and faces an opposing portion (opposing part 48) of the housing.

First carrier 73 includes carrier body 732, and carrier cover 734 that includes opposing part 77 and engages with carrier body 732. Note that as with first carrier 73, opposing part 77 may be provided at any locations as long as it includes a portion disposed at a position opposite to opposing part 48 of the housing in planetary gear mechanism 6. In the case where carrier cover 734 is formed integrally with carrier body 732, it may be provided at the carrier, instead of the carrier cover.

Carrier body 732 houses the sun gear and planetary gear 72 in a turnable state, and sun gear 81 of second planetary gear mechanism 8 that rotates around the same axis as the sun gear is fixed to carrier body 732. Carrier cover 734 is attached to carrier body 732 from one side in the axial direction.

Carrier cover 734 supports the shaft of planetary gear 72 from one side in the axial direction, i.e., from one end portion side in the axial direction. Carrier cover 734 is disposed next to housing cover 41 in the axial direction inside housing 4. Carrier cover 734 includes ring-shaped body part 7342 including center through hole 730, and planetary shaft part 7344 provided upright from body part 7342 in the axial direction.

Planetary shaft part 7344 is inserted in planetary gear 72 in a rotatable manner, and carrier cover 734 is attached to carrier body 732. First carrier 73 supports planetary gear 72 such that it can rotate on its own axis and in orbit around sun gear 71 by engaging it to the outer periphery of sun gear 71 and engaging it with first inner gear 74 at the portion exposed from the housing opening.

Opposing part 77 is configured such that it is slidable on opposite opposing part 48 when planetary gear mechanism 6 is housed in housing 4 and housing cover 41.

Opposing part 77 includes a cone-shaped part whose diameter varies in the axial direction, and opposing part 48 slides with the same axis as the cone-shaped part of opposing part 77 at peripheral surface 772 of the cone-shaped part. As illustrated in FIGS. 3, 6, and 9, for example, peripheral surface 772 of opposing part 77 includes through hole 40a at the center, and has a mortar shape whose diameter decreases toward the other end portion in the axial direction side, i.e., the other side in the axial direction.

In other words, as the cone-shaped part, the opposing part 77 includes a cone-shaped recess whose center side is recessed to the outer periphery side, and the cone-shaped recess is a tapered surface recessed on the center side. Note that in cross-sectional view, the tapered surface may be a straight line or a curved line. Opposing part 77 includes flat annular surface 774 contiguous with peripheral surface 772 on the other end portion side of peripheral surface 772 as the tapered surface in the axis direction. It is preferable that this shape corresponds to the shape of opposing part 48.

First inner gear 74 is disposed at the periphery of first planetary gear 72, and engages with first planetary gear 72. First inner gear 74 includes cylindrical cylindrical part 741 in which the first inner teeth is provided in the inner peripheral surface. The first inner teeth include spiral teeth cut obliquely to the central axis of cylindrical part 741 (the central axis common to the central axis of rotation shaft 12 of motor 10). Such a cylindrical part 741 is a helical gear and an inner gear.

In the housing space of housing 4, cylindrical part 741 is disposed inside first housing element 451 and at the periphery of first planetary gear 72. In this state, a small gap is present in the radial direction between the outer peripheral surface of cylindrical part 741 and the inner peripheral surface of first housing element 451. The first inner teeth of cylindrical part 741 engages with the first planetary teeth of first planetary gear 72. Note that the first inner teeth may include a tooth that is parallel to the central axis of cylindrical part 741. That is, cylindrical part 741 may be a spur gear and an inner gear.

A plurality of first ridges 741a (in the present embodiment, three first ridges 741a for each of end portions separated in the axial direction) including outer periphery groove part 741c is provided at the outer peripheral surface of cylindrical part 741. First ridge 741a extends in the circumferential direction. Through the engagement of outer periphery groove part 741c and ridge 451d, the rotation of first inner gear 74 with respect to housing 4 is limited. In this manner, cylindrical part 741 is supported such that it can be slightly inclined and moved in the axial direction with respect to first housing element 451 (housing 4). That is, cylindrical part 741 is supported in a floating manner with respect to first housing element 451 (housing 4).

The end portion of cylindrical part 741 on one side in the axis direction (hereinafter referred to as first end portion of cylindrical part 741) faces connection cylindrical part 43 of housing cover 41 in housing 4 with a small gap therebetween in the axial direction. Thus, the movement of cylindrical part 741 to one side in the axis direction is limited to a predetermined amount by housing cover 41.

On the other hand, the end portion of cylindrical part 741 on the other side in the axis direction (hereinafter referred to as second end portion of cylindrical part 741) faces step 452b of second housing element 452 in housing 4 with a predetermined gap therebetween in the axial direction. Thus, the movement of cylindrical part 741 in the axis direction is limited to a predetermined amount by the other side step 452b.

Note that cylindrical part 741 may be fixed in the state where it is non-movable with respect to first housing element 451 (housing 4). In addition, cylindrical part 741 may be composed of first housing element 451 (housing 4).

Second Planetary Gear Mechanism 8

Second planetary gear mechanism 8 outputs the rotation transmitted from first planetary gear mechanism 7 after decelerating it at predetermined deceleration ratio. Second planetary gear mechanism 8 is provided on the other side in the axial direction (the output side and the right side of FIG. 1) relative to first planetary gear mechanism 7.

In the housing space of housing 4, second planetary gear mechanism 8 is disposed in second housing element 452 of housing 4, or more specifically, at a portion corresponding to second inner gear part 452a. Note that second planetary gear mechanism 8 may be omitted.

In the present embodiment, second planetary gear mechanism 8 includes sun gear 81, planetary gear 82, and second carrier 83 that rotatably supports planetary gear 82. While it suffices that second planetary gear mechanism 8 includes one or more planetary gears 82, it includes three planetary gears 82 in the present embodiment.

Sun gear 81 is an outer gear, and includes the sun teeth portion at the outer peripheral surface. In the present embodiment, the sun teeth portion includes spiral teeth cut obliquely to the central axis of sun gear 81, and sun gear 81 is a so-called helical gear.

In the present embodiment, sun gear 81 is fixed in the state where each axis line coincides with first carrier 73 of first planetary gear mechanism 7. In this manner, sun gear 81 rotates in association with the rotation of first carrier 73 of first planetary gear mechanism 7 along with the rotation of first carrier 73 of first planetary gear mechanism 7. That is, along with the rotation of first carrier 73 of first planetary gear mechanism 7, sun gear 81 rotates in the same rotational direction as first carrier 73 of first planetary gear mechanism 7 and at the same rotational speed as first carrier 73 of first planetary gear mechanism 7.

Planetary gear 82 is an outer gear with the planetary teeth formed in the outer peripheral surface. The plurality of planetary gears 82 is disposed at even intervals between sun gear 81 and second inner gear part 452a, and meshes (engages) with both sun gear 81 and second inner gear part 452a. In the present embodiment, the plurality of planetary gears 82 is disposed on the same circle around the axis of second planetary gear mechanism 8, and is supported by planetary shaft 86 of second carrier 83 in a rotatable manner. In the present embodiment, the planetary teeth include spiral teeth cut obliquely to the axis of planetary gear 82, and planetary gear 82 of the present embodiment is a so-called helical gear.

Each planetary gear 82 rotates around its own central axis (planetary shaft 86) on the basis of the rotation of sun gear 81. In addition, each planetary gear 82 rotates around sun gear 81 on the basis of its own rotation and the engagement with second inner gear part 452*a*. The central axis of the rotation of planetary gear 82 may coincide with the central axis of sun gear 81.

Second carrier 83 supports planetary gear 82 such that it is rotatable (on its own axis). Additionally, second carrier 83 rotates on the basis of the rotation of planetary gear 82, and transmits it to the output shaft connected to output shaft connecting part 87.

Second carrier 83 includes, for example, gear holding part 834, and second carrier body 835 that holds output shaft connecting part 87.

Gear holding part 834 includes planetary shaft 86 provided in the axis direction at a ring part making up the end portion of second carrier 83 on one side in the axis direction, and rotatably supports planetary gear 82 with the shaft part inserted thereto. Gear holding part 834 is joined to second carrier body 835. Each planetary gear 82 is exposed from the housing opening (omitted in the drawing) formed in the outer peripheral surface of second carrier body 835. In this manner, planetary gear 82 is attached in the state where it partially protrudes outward from the housing opening in the radial direction and protrudes from the outer peripheral surface of second carrier 83. In this manner, the planetary teeth mesh with the teeth of second inner gear part 452*a*.

Output shaft connecting part 87 is provided upright on the other side (output side) than second carrier body 835. Output shaft connecting part 87 is formed in a cylindrical shape with a smaller size than second carrier body 835, and the output shaft is connected to the inside of output shaft connecting part 87 in the radial direction.

Note that, for example, the output shaft is formed in a shaft shape, held by second carrier 83, and rotated together with second carrier 83. Output shaft connecting part 87 has a tooth with a knurling shape at the inner periphery of the end portion on the output side.

Operation and Effect of Planetary Gear Device 3

Figure 10:
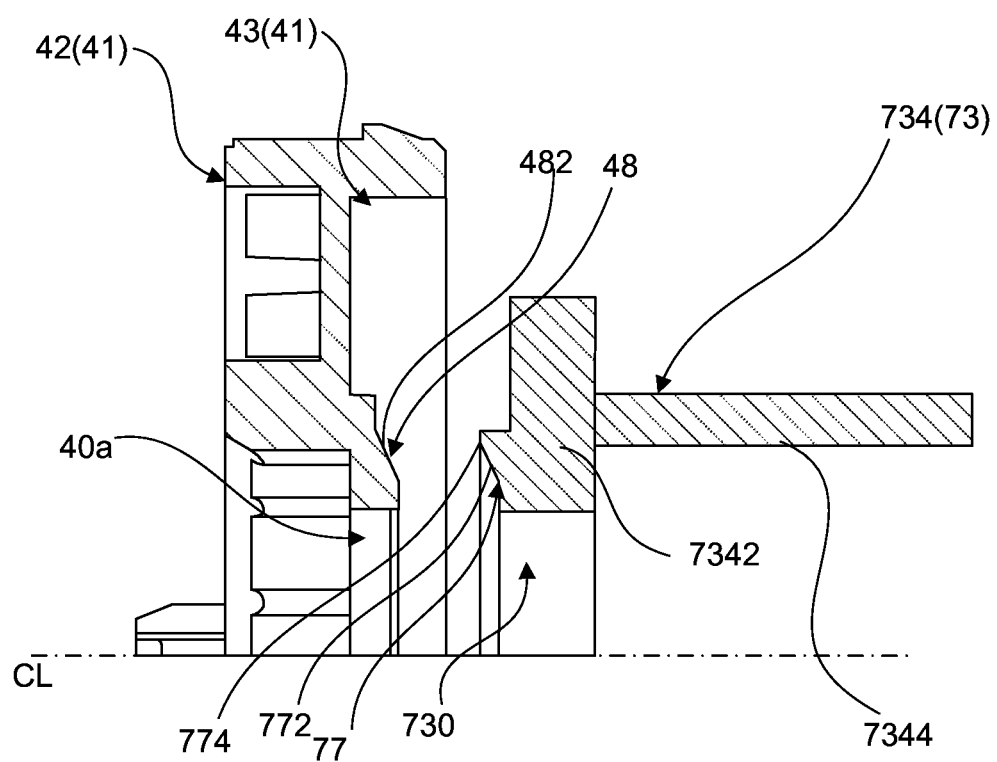
FIG. 10 is a partially enlarged sectional view of a sliding portion of a housing cover and a carrier cover.

FIG. 10 is a partially enlarged sectional view of a sliding portion of carrier cover 734 and housing cover 41. Planetary gear device 3 of the present embodiment includes housing cover 41 and carrier cover 734. Housing cover 41 is disposed at one end portion, in the axis direction, of housing 4 that houses sun gear 71 and planetary gear 72 inside. Carrier cover 734 is disposed next to housing cover 41 in the axial direction inside housing 4, and supports the shaft of planetary gear 72 from one end portion side of the housing in the axis direction.

One of the pair of opposing parts 48 and 77 that are opposite to each other in housing cover 41 and carrier cover 734 includes a cone-shaped part whose diameter varies in the axial direction, and the other opposing part includes the sliding part that slides on the peripheral surface of the cone-shaped part with the same axis as the axis of the cone-shaped part.

Opposing part 77 of carrier cover 734 includes, as the cone-shaped part, a cone-shaped recess including peripheral surface 772 with the center side recessed with respect to the outer periphery side, and opposing part 48 of housing cover 41 includes, as the sliding part that slides on peripheral surface 772, a cone-shaped protrusion with the center portion protruding to the outer periphery part.

In addition, the cone-shaped recess of opposing part 77 of carrier cover 734 includes peripheral surface 772 as the tapered surface recessed on the center side, and outer periphery part 482 as the cone-shaped protrusion of housing cover 41 includes a tapered surface protruding on the center side.

When opposing part 48 of housing cover 41 and opposing part 77 of carrier cover 734 slide on each other when planetary gear device 3 is driven, both of them are naturally driven into rotation with the same axis.

In this manner, housing side opposing part 48 and opposing part 77 on the planetary gear mechanism 6 side slide on each other, and the axis of first carrier or planetary gear mechanism 6 coincides with respect to housing 4, and thus, their axis deviation can be prevented. Thus, the rotational axial deviation of the carrier can be suppressed, first carrier 73 can be stably rotated in housing 4, and the planetary gear device can be stably driven. In addition, since first carrier 73 can be stably driven with no axial deviation with respect to housing 4, the quietness of the planetary gear device can be improved.

Note that even with a configuration in which the cone-shaped recess is composed of a recessed sphere and the cone-shaped protrusion is composed of a convex spherical surface, operations and effects similar to those of planetary gear device 3 of the present embodiment can be achieved.

In addition, the pair of opposing parts 48 and 77 are disposed on the inside relative to the axis of planetary gear 72 in the radial direction of sun gear 71. That is, in the configuration in which first carrier 73 (carrier cover 734) turns with the same axis with housing 4 (housing cover 41) in planetary gear device 3, the axial deviation of them can be prevented at a position near the rotation axis.

Thus, in comparison with the configuration in which the pair of opposing parts on the housing side and the carrier side is disposed on the outside than the axis of the planetary gear in the radial direction of the sun gear, the closeness to the rotation center allows for easier adjustment of the axial deviation, with the reduced sliding regions.

In addition, in planetary gear device 3 of the present embodiment, opposing part 77 of carrier cover 734 is the cone-shaped recess and opposing part 48 of housing cover 41 is the cone-shaped protrusion, an opposite configuration may also be employed. Specifically, opposing part 77 and opposing part 48 of housing cover 41 may include a cone-shaped protrusion and a cone-shaped recess, respectively.

Joining of Housing 4 and Housing Cover 41

Figure 11:
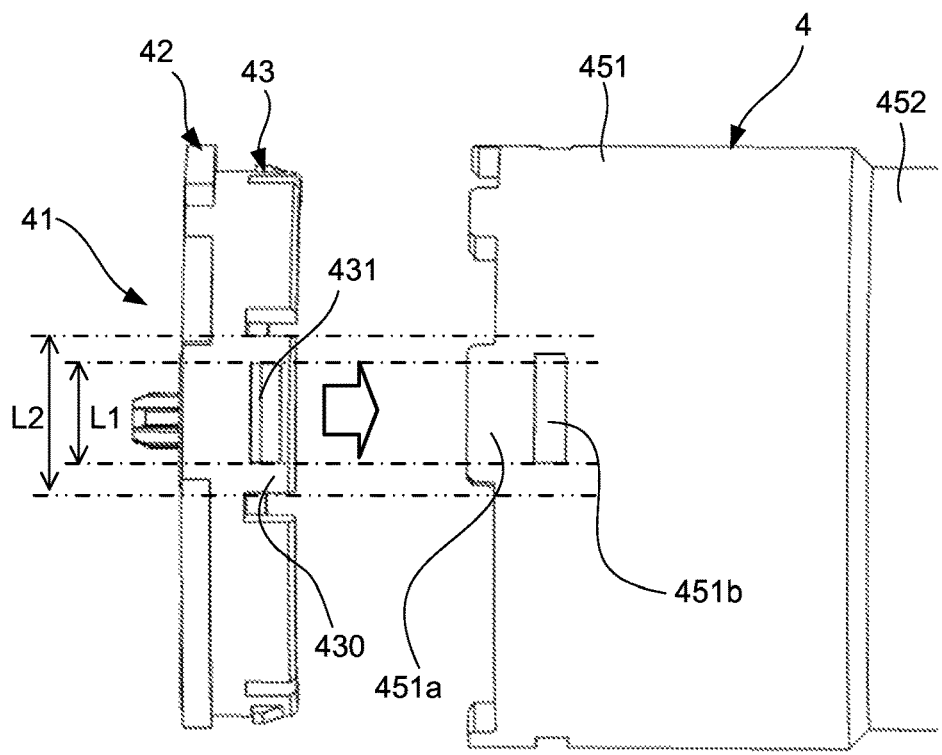
FIG. 11 is a side view illustrating a relationship between an engaging hole of a housing and an engaging claw part of a housing cover.
Figure 12:
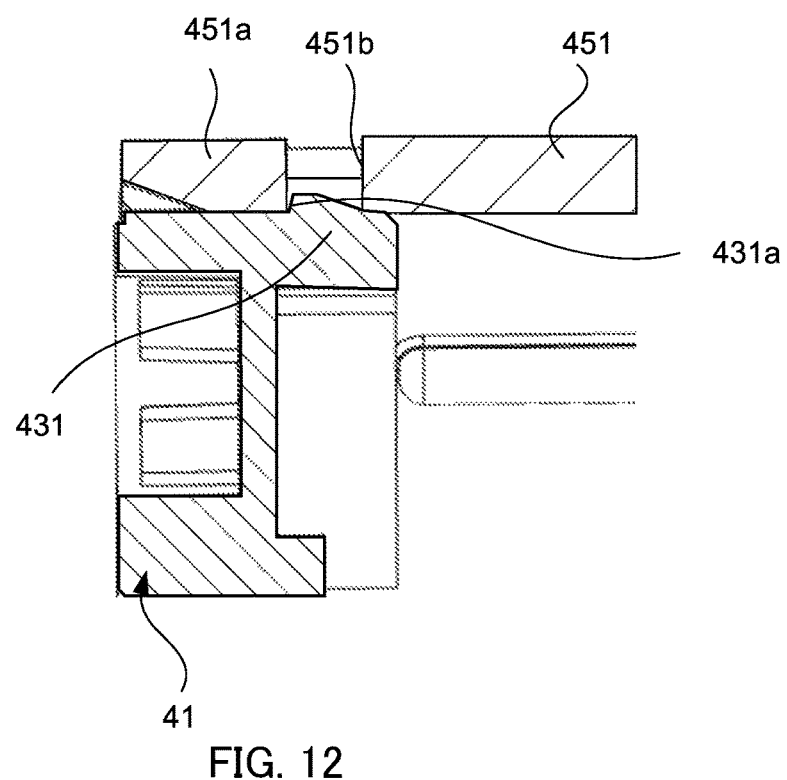
FIG. 12 is an enlarged partial sectional view illustrating an engagement relationship between the housing and the housing cover of FIG. 3.

FIG. 11 is a side view illustrating a relationship between engaging claw part 431 of housing cover 41 and engaging hole 451*b* of housing 4, and FIG. 12 is an enlarged partial sectional view illustrating an engagement relationship between housing 4 and housing cover 41 of FIG. 3.

Connection cylindrical part 43 is inserted from one end portion side of housing 4 and joined to one end portion. Connection cylindrical part 43 is configured with an arched wall part disposed in a cylindrical form in the circumferential direction as viewed from the axial direction.

Engaging claw part 431 is provided in a manner radially protruded to the outside from the center of fixing part 42 at the outer surface of the arched wall part illustrated in FIGS. 3, 4, and 11. Engaging claw part 431 provided with a protrusion is of a so-called snap-fit type, and it is engaged with engaging hole 451*b* when fit in engaging hole 451*b* and locked at the edge of engaging hole 451*b*.

Engaging claw part 431 extends in the circumferential direction (with width L1 as a circumferential length) at a center portion of the outer surface of arched wall part 430.

When engaging claw part 431 engages with engaging hole 451b, arched wall part 430 closes engaging hole 451b at the outer surface region of arched wall part 430 when inserted to housing 4.

Arched wall part 430 is wider to both sides in the circumferential direction than engaging hole 451b in the circumferential direction, and has width L2. In addition, the length of arched wall part 430 in the axial direction, i.e., the insertion direction is greater than the axial length of engaging hole 451b. In this manner, when inserted in housing 4, arched wall part 430 is disposed such that it overlaps engaging hole 451b at the center region with respect to housing 4, i.e., it closes the peripheral portion of engaging hole 451b together with engaging hole 451b. Thus, without performing laser welding, the inner airtightness sealed with housing 4 and housing cover 41 can be improved, and the leakage of the grease applied inside can be prevented.

In addition, as illustrated in FIG. 12, a tapered portion whose outer diameter gradually decreases toward the end portion on the other side in the axial direction is provided at portion 431a of engaging claw part 431 that is locked at an end portion on the opening side in engaging hole 451b when engaging claw part 431 is disposed and engaged in engaging hole 451b. That is, in engaging claw part 431, the outer diameter is smaller on the other side than on one side in the axial direction, and this tapered portion achieves gapless engagement with the end opening of housing 4.

The above is a description of an embodiment of the present invention. The embodiments disclosed here should be considered illustrative in all respects and not restrictive. The scope of the invention is indicated by the claims rather than the description given above, and it is intended that all changes within the meaning and scope of the claims be included. In other words, the above description of the configuration of the device and the shape of each part is an example, and it is clear that various changes and additions to these examples are possible within the scope of the present invention.

INDUSTRIAL APPLICABILITY

The planetary gear device according to the embodiment of the present invention provides an effect of suppressing the rotational axial deviation of the carrier for stable driving, and is useful as a planetary gear device used for an actuator for opening closing a back door and the like.

REFERENCE SIGNS LIST

1 Actuator
3 Planetary gear device
4 Housing
6 Planetary gear mechanism
7 First planetary gear mechanism
8 Second planetary gear mechanism
10 Motor
11 Motor body
12 Rotation shaft
40a Through hole
41 Housing cover
42 Fixing part
43 Connection cylindrical part
45 Body cylindrical part
46 Annular part
47 Support cylindrical part
48, 77 Opposing part
71, 81 Sun gear
72, 82 Planetary gear
73 First carrier
74 First inner gear
83 Second carrier
86 Planetary shaft
87 Output shaft connecting part
111 Support surface
112, 112a, 112b Fixation hole
402 Axial direction outer surface
404 Housing cover inner surface
421a, 421b Planetary side fixing part
423, 424 Engaging recess
430 Arched wall part
431 Engaging claw part
431a Portion
451 First housing element
451a Engaging protrusion
451b Engaging hole
451c Guide groove
451d Ridge
451e Key protrusion
452 Second housing element
452a Second inner gear part
452b Step
482 Outer periphery part
730 Center through hole
732 Carrier body
734 Carrier cover
741 Cylindrical part
741a First ridge
741c Outer periphery groove part
772 Peripheral surface
774 Annular surface
834 Gear holding part
835 Second carrier body
7342 Body part
7344 Planetary shaft part

The invention claimed is:

1. A planetary gear device comprising:
a housing cover disposed at one end portion of a housing in an axis direction, the housing being configured to house a sun gear and a planetary gear inside the housing; and
a carrier cover disposed next to the housing cover in the axial direction in the inside, fixed to a carrier rotatably supporting planetary gear and configured to support a shaft of the planetary gear from one end portion side in the axial direction, wherein
one opposing part of a pair of opposing parts opposite to each other in the housing cover and the carrier cover includes a cone-shaped part whose diameter varies in the axial direction, and the other opposing part of the pair of opposing parts includes a sliding part configured to slide on a peripheral surface of the cone-shaped part with a same axis as an axis of the cone-shaped part;
wherein the cone-shaped part includes a cone-shaped recess whose center side is recessed with respect to an outer periphery side; and,
wherein the sliding part includes a cone-shaped protrusion whose center portion protrudes with respect to an outer periphery part.

2. The planetary gear device according to claim 1, wherein the cone-shaped recess is a tapered surface whose center side is recessed; and
wherein the cone-shaped protrusion is a tapered surface whose center side is protruded.

3. The planetary gear device according to claim 1, wherein the pair of opposing parts is disposed inside relative to an axis of the planetary gear in a radial direction of the sun gear.

\* \* \* \* \*